United States Patent [19]

Quarterman

[11] Patent Number: 4,863,350
[45] Date of Patent: Sep. 5, 1989

[54] AIR TURBINE

[76] Inventor: Edward A. Quarterman, 2284 Evans St., Livermore, Calif. 94550

[21] Appl. No.: 273,026

[22] Filed: Nov. 18, 1988

[51] Int. Cl.$^4$ .............................................. F03D 1/06
[52] U.S. Cl. ................................. 416/193 R; 416/189; 416/196 A
[58] Field of Search ........... 416/189 A, 196 A, 193 R

[56] References Cited

U.S. PATENT DOCUMENTS

| | | | |
|---|---|---|---|
| 1,441,788 | 1/1923 | De Coninck | 416/193 R |
| 1,739,866 | 12/1929 | Schuh | 416/193 R |
| 2,123,657 | 7/1938 | Munk | 416/189 A X |
| 4,147,472 | 4/1979 | Kling | 416/193 R |
| 4,289,450 | 9/1981 | Kling | 416/189 A X |
| 4,330,714 | 5/1982 | Smith | 416/196 A X |
| 4,362,469 | 12/1982 | van Holten | 416/191 |

FOREIGN PATENT DOCUMENTS

| | | | |
|---|---|---|---|
| 455854 | 11/1928 | Fed. Rep. of Germany | 416/189 A |
| 3210405 | 9/1983 | Fed. Rep. of Germany | 416/189 A |
| 213022 | 3/1924 | United Kingdom | 416/196 A |

*Primary Examiner*—Everette A. Powell, Jr.
*Attorney, Agent, or Firm*—H. Michael Brucker

[57] ABSTRACT

An air turbine including a plurality of elongated rotor blades extending from a hub, first and second airfoils interconnecting the blades, and a vane element positioned between the airfoils, said airfoils and vane element being concentrically disposed about the hub.

6 Claims, 1 Drawing Sheet

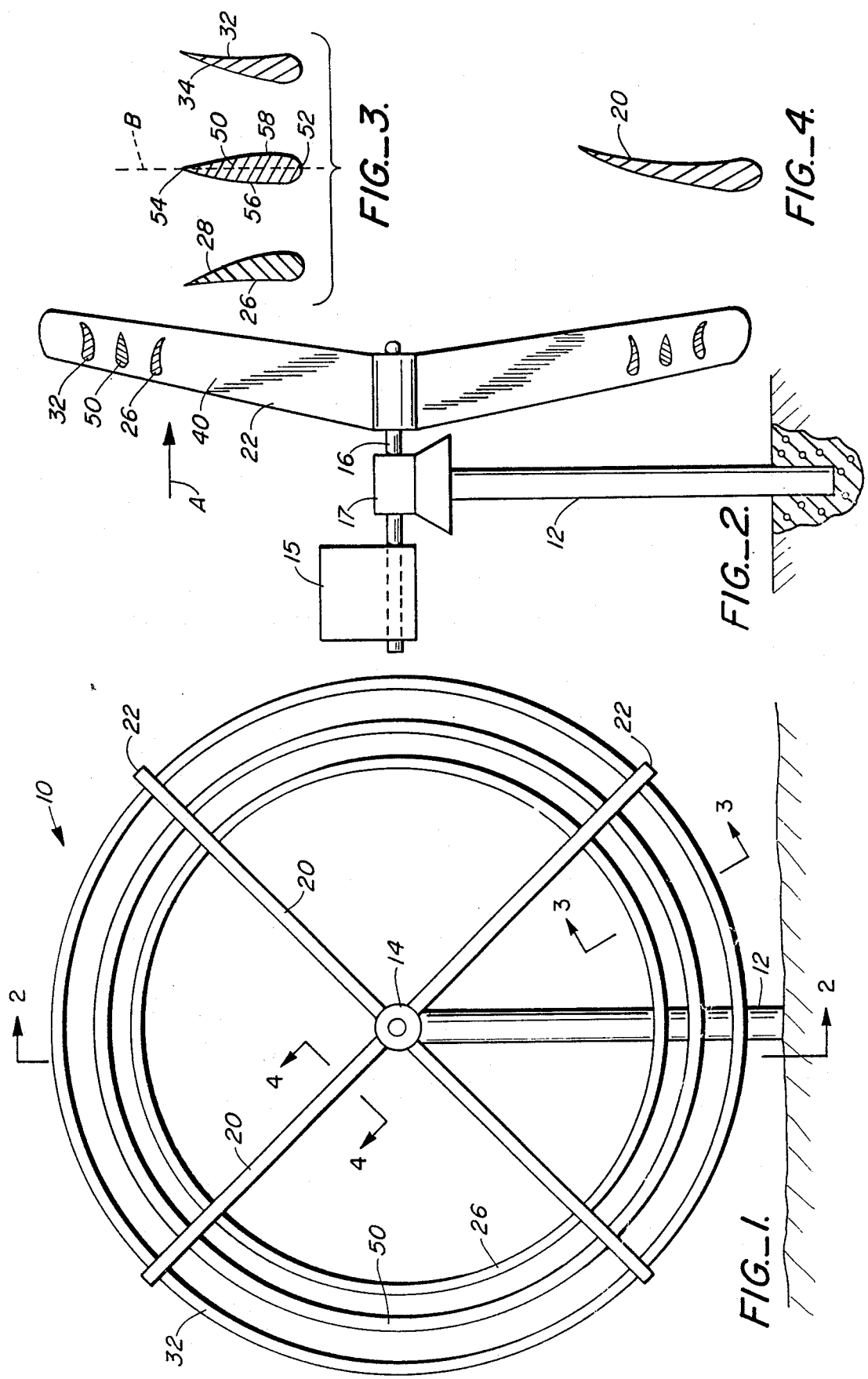

AIR TURBINE

TECHNICAL FIELD

This invention relates to an air turbine, and in particular, an air turbine incorporating specific structure which modifies the flow of air through the turbine to significantly increase the amount of energy conveyed to the turbine by the air.

BACKGROUND ART

U.S. Pat. No. 4,147,472, issued Apr. 3, 1979, discloses a turbine rotor in which an inner annular shroud is attached to a central hub by spokes. Short rotor blades radiate outwardly from the inner shroud to an outer shroud which defines the outer periphery of the rotor. The shrouds operate as airfoils and cooperate to increase the flow of air therebetween. Thus, more energy is transmitted to the short rotor blades located between the shrouds.

DISCLOSURE OF THE INVENTION

The present invention also relates to an air turbine which utilizes airfoils to enhance wind flow through the turbine. However, the air turbine constructed in accordance with the teachings of the present invention incorporates several structural features which make it more efficient then that disclosed in U.S. Pat. No. 4,147,472.

In particular, the turbine of the present invention includes a hub member adapted to be rotatably mounted on a support structure. A plurality of elongated rotor blades having an airfoil configuration extend radially outwardly from the hub member, the blades having distal ends.

A first airfoil interconnects the blades at a first location on the blades and has a smoothly curved airfoil surface. A second airfoil, also having a smoothly curved airfoil surface, interconnects the blades at a second location on the blades. The airfoils are concentrically disposed about the hub with the airfoil surfaces thereof diverging to define an air flow channel increasing in size in the direction of air flow.

A vane element interconnects the blades and is concentrically positioned between the first and second airfoils in the air flow channel. The vane element has a leading end and a trailing end interconnected by streamlined surfaces converging together in the direction of air flow and also diverging from the airfoil surfaces. The airfoils and vane element are spaced inwardly from the distal ends of the blades. With the arrangement just described, the rotor blades, airfoils, and vane element cooperate to provide enhanced, smooth air flow over an extensive portion of the turbine.

Other features, advantages, and objects of the present invention will become apparent with reference to the following detailed description and accompanying drawings.

BRIEF DESCRIPTION OF THE DRAWINGS

FIG. 1 is an elevation view of a preferred form of air turbine constructed in accordance with the teaching of the present invention;

FIG. 2 is a cross-sectional view taken along line 2—2 of FIG. 1;

FIG. 3 is a cross-sectional view taken along line 3—3 of FIG. 1; and

FIG. 4 is a cross-sectional view taken along line 4—4 of FIG. 1.

BEST MODE FOR CARRYING OUT THE INVENTION

Referring now to the drawings, an air turbine constructed in accordance with the teachings of the present invention is generally designated by reference numeral 10. The turbine 10 is mounted on a suitable support 12. Hub member 14 is affixed to a shaft which rotates within a suitable bearing with the other end of shaft being a point of takeoff of power to drive a suitable electric generator 15. The air turbine and the electric generator, being suitably placed to about counter balance each other, are mounted as a unit on a suitable swivel 17 atop the support 12.

A plurality of elongated rotor blades 20 having an airfoil configuration (see FIG. 4) extend radially outwardly from the hub member, said blades having distal ends 22.

A first airfoil 26 interconnects the blades at a first location on the blades. First airfoil 26 has a smoothly curved airfoil surface 28 which is disposed outwardly as shown.

A second airfoil 32 interconnects rotor blades 20 at a second location on the blades. The second airfoil 32 also has a smoothly curved airfoil surface 34. Airfoil surface 34 faces inwardly; that is, it is in direct opposition to airfoil surface 28. Airfoils 26, 32 are concentrically disposed about hub member 14 with the airfoil surfaces thereof diverging as illustrated to define an air flow channel 40 increasing in cross-sectional area in the direction of air flow indicated by the arrow A (FIG. 2).

A vane element 50 interconnects rotor blades 20 and is concentrically positioned between the first and second airfoils 26, 32. The vane element has a leading end 52 and a trailing end 54 interconnected by streamlined surfaces 56, 58 converging together in a direction of air flow and diverging from the airfoil surfaces 28, 32. Vane element 50 is symmetrical about a central axis B (FIG. 3) located equidistant between airfoils 26, 28.

As viewed from the from the front, as illustrated in FIG. 1, it may be seen that the turbine rotor airfoils and vane element are spaced inwardly from the distal ends 22 of rotor blades 20. It may also be seen that the outer airfoil, airfoil 32, is located adjacent to the blade distal ends. The airfoils and the vane element each have a circular configuration and surround the hub member.

It has been found that the device constructed in accordance with the teachings of the present invention functions to provide an enhanced, smooth flow of air across an extensive portion of the turbine structure. The two airfoils and concentric vane member cooperate to induce increased laminar air flow through the air flow channel. Merely increasing the velocity of turbulent air does not efficiently increase the energy that may be extracted from it, whereas increasing the velocity of laminar air flow accomplishes this end result.

Although the primary increase in air flow takes place between circumferential airfoils 26 and 32, the air adjacent thereto is also increased in velocity and able to impart energy to the turbine. To take advantage of this residual increased air flow, circumferential airfoil 32 is disposed radially inward of the distal ends 22 of the rotor blades 20 so that the residual increased air flow will have a section of rotor blade to act against.

It will also be appreciated that with the arrangement of the present invention, air impinges on the rotor blades all the way from the hub member to the distal ends thereof which are spaced beyond the outermost airfoil. Enhanced air flow produced by the airfoils and vane element will contact the airfoil configured blades 20 over a considerable length thereof. Because airfoil 32 is spaced inwardly from the blade distal ends, the blades are engaged by enhanced air flow at locations both inwardly and outwardly of both airfoils.

I claim:

1. An air turbine comprising, in combination:

a hub member adapted to be rotatably mounted on a support structure;

a plurality of elongated rotor blades radially extending from said hub member, said blades having distal ends;

a first airfoil interconnecting said blades at a first location on said blades and having a smoothly curved airfoil surface;

a second airfoil interconnecting said blades at a second location on said blades and having a smoothly curved airfoil surface, said airfoils being concentrically disposed about said hub member with the airfoil surfaces thereof diverging to define an air flow channel increasing in cross-sectional area in the direction of air flow; and a vane element interconnecting said blades and concentrically positioned between said first and second airfoils in said air flow channel, said vane element having a leading end and a trailing end interconnected by streamlined surfaces converging together in the direction of air flow and diverging from said airfoil surfaces.

2. The air turbine according to claim 1 wherein said airfoils and said vane element are spaced inwardly from the distal ends of said blades.

3. The air turbine according to claim 1 wherein said vane element is symmetrical about a central axis located equidistant between said airfoils.

4. The air turbine according to claim 2 wherein one of said airfoils is located adjacent to said blade distal ends.

5. The air turbine according to claim 1 wherein said airfoils and said vane element each have a circular configuration and surround said hub member.

6. The air turbine according to claim 2 wherein each of said blades has an airfoil configuration and wherein said airfoils and said vane element cooperate to enhance air flow at locations on said blades both inwardly and outwardly of both said first and second airfoils.

* * * * *